US006112150A

United States Patent [19]

Irons et al.

[11] Patent Number: 6,112,150

[45] Date of Patent: Aug. 29, 2000

[54] FAULT RECOGNITION SYSTEM AND METHOD FOR AN INTERNAL COMBUSTION ENGINE

[76] Inventors: John M. Irons, 966 Bayside Ct., Greenwood, Ind. 46143; Edward J. Lewandowski, 20600 E. 500 S., Scipio, Ind. 47273; Scott G. Decker, 3864 Greenbriar Dr., Columbus, Ind. 47203; Gregg G. Greathouse, 782 Knollwood Dr., Columbus, Ind. 47203; Irfan Tusneem, 1191-B Thicket Ct., Columbus, Ind. 47201

[21] Appl. No.: 09/289,553

[22] Filed: Apr. 9, 1999

[51] Int. Cl.[7] .............................. G06G 7/76; G06F 17/00

[52] U.S. Cl. ............................ 701/114; 701/115; 701/35; 73/118.3

[58] Field of Search .................................... 701/114, 115, 701/102, 101, 26, 29, 35; 73/116, 117.3, 118.3; 340/348

[56] References Cited

U.S. PATENT DOCUMENTS

| | | | |
|---|---|---|---|
| 4,635,214 | 1/1987 | Kasai et al. . | |
| 5,010,487 | 4/1991 | Stonehocker . | |
| 5,041,976 | 8/1991 | Marko et al. . | |
| 5,331,560 | 7/1994 | Tamura . | |
| 5,414,645 | 5/1995 | Hirano . | |
| 5,448,722 | 9/1995 | Lynne et al. . | |
| 5,453,939 | 9/1995 | Hoffman et al. | 702/183 |
| 5,462,034 | 10/1995 | Kadota . | |
| 5,481,906 | 1/1996 | Nagayoshi et al. | 73/116 |
| 5,491,631 | 2/1996 | Shirane et al. | 701/35 |
| 5,506,773 | 4/1996 | Takaba et al. . | |
| 5,566,091 | 10/1996 | Schricker et al. . | |
| 5,602,732 | 2/1997 | Nichols et al. . | |
| 5,617,337 | 4/1997 | Eidler et al. . | |
| 5,631,831 | 5/1997 | Bird et al. . | |
| 5,671,141 | 9/1997 | Smith et al. | 701/29 |
| 5,696,676 | 12/1997 | Takaba . | |
| 5,754,965 | 5/1998 | Hagenbuch . | |
| 5,757,645 | 5/1998 | Schneider et al. . | |
| 5,845,272 | 12/1998 | Morjaria et al. . | |
| 5,880,674 | 3/1999 | Ufkes et al. | 340/438 |
| 5,922,079 | 7/1999 | Booth et al. | 714/26 |
| 5,964,811 | 10/1999 | Ishii et al. | 701/29 |

FOREIGN PATENT DOCUMENTS

| | | |
|---|---|---|
| 3609428 | 9/1997 | Germany . |

*Primary Examiner*—Henry C. Yuen
*Assistant Examiner*—Hieu T. Vo

[57] ABSTRACT

A fault recognition system is implemented as an adjunct to fault determination software of an on-board engine control module (ECM). The ECM activates a “Type A” or “Type B” fault code for each signal received from a plurality of sensors disposed about the engine when that signal exceeds a predetermined threshold. A “Type C” fault is recognized and activated when all of a predetermined group of underlying “Type A” or “Type B” fault codes have been activated. The “Type C” fault is displayed, while the underlying faults may or may not be displayed. The “Type C” fault provides a better and more immediate indication of the source of the engine problem than any of the underlying faults. Only those underlying faults that aid in the recognition of the source of the engine problem are displayed. The remaining faults underlying the “Type C” fault are masked. When the “Type C” fault becomes inactive, any underlying fault codes are unmasked for subsequent evaluation. To avoid false positives or negatives, all of the underlying faults must be activated for a predetermined period before the “Type C” fault will be activated. Likewise, before the “Type C” fault is de-activated, at least one of the underlying faults must be inactive for a predetermined period.

23 Claims, 4 Drawing Sheets

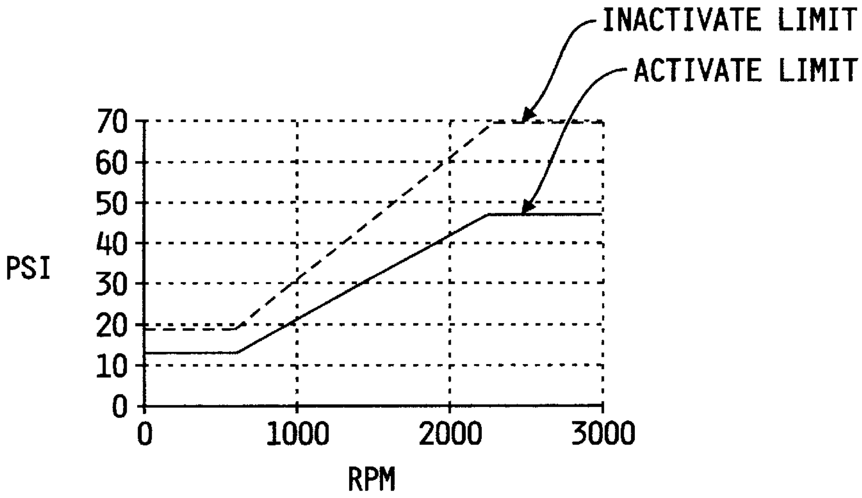

FIG. 3

| Code | Fault |
|---|---|
| 1 | High Intake Manifold Pressure, LB |
| 2 | Low Intake Manifold Pressure, LB |
| 3 | High Intake Manifold Pressure, RB |
| 4 | Low Intake Manifold Pressure, RB |
| 5 | RB Intake Manifold Pressure Sensor Failed High |
| 6 | RB Intake Manifold Pressure Sensor Failed Low |
| 7 | Throttle Position - Component Shorted Low (J1587) |
| 8 | Oil Pressure Sensor Failed High |
| 9 | Pre Oil Filter Pressure Sensor Failed High |
| 10 | Pre Oil Filter Pressure Sensor Failed Low |
| 11 | Oil Pressure Sensor Failed Low |
| 12 | Low Oil Pressure |

| Code | Fault |
|---|---|
| 1671 | Pre High Lube Filter Reduction |
| 1672 | High Blowby Pressure |
| 1673 | Low #4 LB Cylinder Power |
| 1674 | Low #5 LB Cylinder Power |
| 1675 | Low #6 LB Cylinder Power |
| 1676 | Low #7 LB Cylinder Power |
| 1677 | Low #8 LB Cylinder Power |
| 1678 | Intake Air Leak LBF |
| 1679 | Low #1 RB Cylinder Power |
| 1680 | Low #2 RB Cylinder Power |
| 1681 | Low #3 RB Cylinder Power |
| 1682 | Low #4 RB Cylinder Power |

| | |
|---|---|
| 234 | High Coolant Temperature |
| 235 | LBF Intake Manifold Temperature Sensor Failed High |
| 236 | LBF Intake Manifold Temperature Sensor Failed Low |
| 237 | High Intake Manifold Temperature LBF |
| 238 | LBR Intake Manifold Temperature Sensor Failed High |
| 239 | LBR Intake Manifold Temperature Sensor Failed Low |
| 240 | High Intake Manifold Temperature LBR |
| 241 | RBF Intake Manifold Temperature Sensor Failed High |
| 242 | RBF Intake Manifold Temperature Sensor Failed Low |
| 243 | High Intake Manifold Temperature RBF |
| 244 | RBR Intake Manifold Temperature Sensor Failed High |
| 245 | RBR Intake Manifold Temperature Sensor Failed Low |
| 246 | High Intake Manifold Temperature RBR |

| | |
|---|---|
| 2037 | Low Coolant Pressure |
| 2038 | Engine Overspeed |
| 2039 | Low Coolant Level |
| 2040 | Oil Level Invalid (Sensor) |
| 2041 | Low Oil Level |
| 2042 | Internal Address Fault - ECM Data Lost |
| 2043 | Internal Bus Fault - ECM Data Lost |
| 2044 | High Fuel Pump Inlet Restriction |
| 2045 | Fuel Pump Inlet Restriction Sensor Circuit Failed High |
| 2046 | Fuel Pump Inlet Restriction Sensor Circuit Failed Low |
| 2047 | J1587 Broadcast Data Missing |
| 2048 | Low Oil Pressure |

FIG. 4

FAULT RECOGNITION SYSTEM AND METHOD FOR AN INTERNAL COMBUSTION ENGINE

BACKGROUND OF THE INVENTION

The present invention concerns systems and methods for the recognition of fault conditions in the operation of an internal combustion engine. More specifically, the invention relates to such systems and methods for recognizing a particular fault condition when other faults exist.

Most modern internal combustion engines, particularly those for vehicles, are electronically controlled and monitored. A typical engine control module (ECM) includes a microprocessor that implements a set of software instructions operable to control various functions of the engine. For instance, the ECM implements fueling algorithms, that control the quantity of air and liquid fuel provided to the engine cylinder, firing time algorithms, and the like. In addition, the typical ECM receives signals from a plurality of sensors disposed at various locations throughout the engine. These sensors provide instantaneous information regarding the operating condition of the engine. The ECM includes software that monitors and evaluates these signals to determine if an engine failure has occurred, or is in the process of occurring.

A typical internal combustion engine controls system 10 is depicted in FIG. 1. The system includes the engine 11 that is comprised of the plurality of pistons 12 connected to the engine crankshaft 13. The engine includes an intake manifold 15 through which ambient air is received, and an exhaust manifold 16 through which the products of combustion are exhausted from each cylinder during each combustion cycle. A fuel system 17 controls the amount of liquid fuel provided to the cylinders. A cooling system 18 and a lubrication system 19 maintain the operating temperature of the engine throughout its entire speed range. All of these components are controlled by one or more control modules that communicate over datalinks. In the illustrated embodiment, one such control module, the ECM 20, is depicted.

The engine operating system 10 also includes a sensor databus 22 that comprises a collection of cables or wires connected between inputs to the ECM 20 and a plurality of condition sensors $\mathbf{23}_a$–$\mathbf{23}_r$. For instance, the sensor $\mathbf{23}_a$ is an ambient temperature sensor, $\mathbf{23}_b$ an oil level sensor, $\mathbf{23}_c$ an oil temperature sensor, $\mathbf{23}_d$ and $\mathbf{23}_e$ oil pressure sensors, etc. Each of these sensors $\mathbf{23}_a$–$\mathbf{23}_r$ provides data at essentially every critical operating point of the vehicle engine system 10. This data includes temperature and pressure values for all of the fluid or gas elements of the system, as well as the engine speed, as provided by the speed sensor $\mathbf{23}_p$.

The ECM 20 also includes a number of output ports 24 that allow data collected by the ECM to be externally read. These output ports can include RS232, J1587 or J1939 communications links, for instance. Data stored within the ECM 20 can be downloaded and evaluated using more sophisticated diagnostic software routines.

In addition, the ECM 20 provides signals to a fault indicator display system 25. This display system can take a variety of forms, depending on the nature of the fault to be indicated. For instance, most vehicles include individual annunciators for low oil pressure and high engine temperature. Other annunciators can include analog or digital gauges showing oil and coolant fluid levels. In a typical industrial or transportation application of an internal combustion engine, a series of annunciator lights are used to indicate various types of faults when the engine is first started, or at user selected times during the operation of the engine. In one type of installation, an array of four annunciator lights are illuminated in a particular sequence corresponding to different fault conditions. In one application, the fault conditions are "flashed out"—i.e., the lights are illuminated sequentially in particular patterns to indicate all of the active faults recognized by the ECM 20. Other displays can include alphanumeric displays or computer-based monitors.

Although there are many fault diagnosis or recognition algorithms in current engine/vehicle control systems, most follow a particular protocol. One such fault recognition system is graphically depicted in FIG. 2, which shows the value of a sensed parameter versus time. In this particular application, an inactive limit and an active limit are defined at particular magnitudes for the sensed value. If the sensed value falls below the inactive limits, no fault condition arises. However, if the sensed value exceeds the active limits for a particular period of time, such as time T1, the fault status is moved to active. So long as the sensed value stays above the active limits, the particular fault remains activated. On the other hand, if the sensed value falls below the inactivate limit for a particular time period, such as time T2, then the fault status is changed to inactive. In a typical fault recognition system, the inactivate limit is offset from the activate limit to avoid cycling of the fault status signal due to normal variations in the sensed value. In addition, in order to avoid a "false negative" or a "false positive," most fault-sensing algorithms require that a sensed value fall outside of the particular limit value for a pre-determined time period.

In many engine operating systems, such as the system 10, various levels of fault conditions are generated, based upon the particular sensor. The graph in FIG. 2 illustrates a "Type A" fault in which the activate and inactivate limits are fixed for the particular sensor value. The "Type A" fault condition can correspond to a coolant or lubrication temperature sensor output, for instance. On the other hand, a "Type B" fault condition corresponds to a sensor whose output can acceptably vary as a function of some other engine-operating condition. One such "Type B" fault condition is depicted in a graph of oil pressure versus engine speed shown in FIG. 3. It is certainly known that engine oil pressure increases with engine operating speed, so the particular inactivate and activate limits will themselves vary as a function of engine speed. Although this "Type B" fault condition requires comparison to speed dependent limits, the ECM diagnosis algorithms operate in essentially the same manner as for a "Type A" fault.

In its simplest form, engine failure diagnosis evaluates only a limited number of potential fault generating conditions. The occurrence of these fundamental fault conditions often provides little information as to the nature of the problem with the engine. For instance, illumination of the traditional oil temperature lamp on a vehicle dashboard only provides an indication that the oil temperature has exceeded an acceptable threshold, but does not provide any information as to the reason why the oil temperature has reached a fault level. As a result, the ECM 20 has evolved to a sophisticated diagnostic tool that can receive and process large amounts of data from the various engine condition sensors $\mathbf{23}_a$–$\mathbf{23}_r$. In addition to the large number of data inputs, the ECM fault-recognition algorithms, that compare these sensor values to a variety of fixed and variable limit values, have also become more sophisticated. Moreover, the typical ECM 20 includes routines that perform various calculations using the data from a number of sensors. For example, cylinder power calculations can be conducted by the ECM to determine the theoretical power being generated by a particular cylinder. These power calculations make use of data from engine exhaust temperature and pressure sensors, intake air temperature and pressure values, and engine speed.

With this higher degree of sophistication, a much greater number of engine failure values are monitored and stored by the typical ECM 20. In a typical application, each particular fault condition is given a unique identifier code. This code can then be accessed by an engine technician, or even by other routines of the ECM, to perform various diagnostic tests. The table in FIG. 4 shows a typical array of fault codes and associated faults. For illustrative purposes, it can be seen that a wide variety of fault conditions can be evaluated and indicated by a typical ECM 20, ranging from high and low intake manifold pressure (Fault Codes 1 and 2), to failure of the pre-oil filter sensor (Code 9), to number four left bank cylinder power (Code 1673), to low oil pressure (Code 2048).

As might be anticipated, one engine failure often leads to a number of faults being activated. In a simple example, if the sensor databus or harness 22, is disconnected from the ECM 20, errors in each of the sensors will be acknowledged by the ECM. In this condition, each of the sensors may be in fact operating properly, but since the harness is disconnected, no sensor data is received by the ECM. The ECM would activate a fault code for each of the sensor fault signals, but these fault codes will not necessarily lead the engine technician to a proper solution.

As another example, fault conditions may arise in the signal from the intake air manifold temperature sensor as well as the low engine power sensor for a particular cylinder. Neither fault code provides adequate failure information on its own. However, it is known that under certain circumstances a rapid rise in manifold temperature accompanied by a low power for a particular cylinder can correspond to a valve seat failure for that cylinder. The inability to specifically pinpoint the source of the two activated fault codes will lead to an increase in engine downtime as the particular failures are diagnosed by an engine technician.

There is therefore a need for an engine failure recognition and diagnosis system that can help pinpoint the actual problem that has arisen within the engine operating system. This need extends to a fault recognition system that accounts for the generation of "false negatives" and helps pinpoint the source of the problem leading to the fault indications.

SUMMARY OF THE INVENTION

These unmet needs are addressed by the fault recognition system and method of the present invention. In one aspect of the invention, a determination is made as to the types of fault conditions that underlie a particular engine failure. In other words, when a specific engine error or failure arises a group of fault signals will be generated corresponding to underlying fault conditions. The present invention recognizes the activation of this group of fault conditions and issues a new signal indicative of this hybrid fault condition. This new signal more accurately leads the engine technician to the real source of the problem.

Thus, the fault recognition system of the present invention reads and registers fault conditions based on all of the condition sensors associated with the engine. The inventive system them determines whether predetermined groups of faults have been activated. If all underlying faults within a group are activated, a "Type C" fault signal is generated indicative of a more distinct engine failure or failure.

In a further aspect of the invention, certain ones of the underlying fault signals are masked or withheld from display to the engine technician. In some cases, an underlying fault signal lends very little to the ultimate diagnosis of the engine difficulty. In other cases, display of an underlying fault signal may lead the engine technician down a less efficient or accurately path for diagnosing the engine problem. Thus, the present invention evaluates the underlying faults and masks certain ones of the faults, even as the "Type C" fault signal is provided.

The invention contemplates a system for fault recognition that can be readily implemented in an existing on-board engine controller. Most engine controllers continuously poll the many condition sensors throughout the engine and compare the sensor signal with predetermined error limits. Many engine controllers also log error conditions for subsequent downloading and evaluation. The present invention contemplates a system and method for immediate, on-line fault recognition and display that provides more meaningful information than prior fault detection systems. For a software based engine controller, a background routine of software instructions can be continuously executed in which the sensors are monitored, fault condition activations are polled and evaluations of predetermined groups of fault conditions are conducted.

In another feature of certain embodiments of the invention, means are provided for eliminating the possibility of "false positives" or "false negatives". In one aspect, a "Type C" fault condition must exist for a predetermined period before the condition is actually logged and displayed. Likewise, when a "Type C" fault condition goes inactive it must remain inactive for a predetermined period before the system recognizes the absence of the fault condition.

It is one object of the invention to provide a fault recognition system that more accurately pinpoints the nature of an engine problem, fault or failure. Another object is accomplished by features that mask or suppress display of underlying fault signals that may otherwise confuse the diagnostic process.

One benefit of the invention is that the engine technician can more easily and quickly determine the origin of an engine problem. A further benefit is that the inventive system and method can be readily integrated into the fault diagnosis routines of an engine controller.

These and other objects, advantages and features are accomplished according to the systems and methods of the present invention, as described herein with reference to the accompanying figures.

DESCRIPTION OF THE FIGURES

FIG. 3 is a graph showing a protocol for another type of engine failure condition.

FIG. 4 is a chart showing a representative table of engine failures and corresponding fault codes.

DESCRIPTION OF THE PREFERRED EMBODIMENTS

Figure 1:
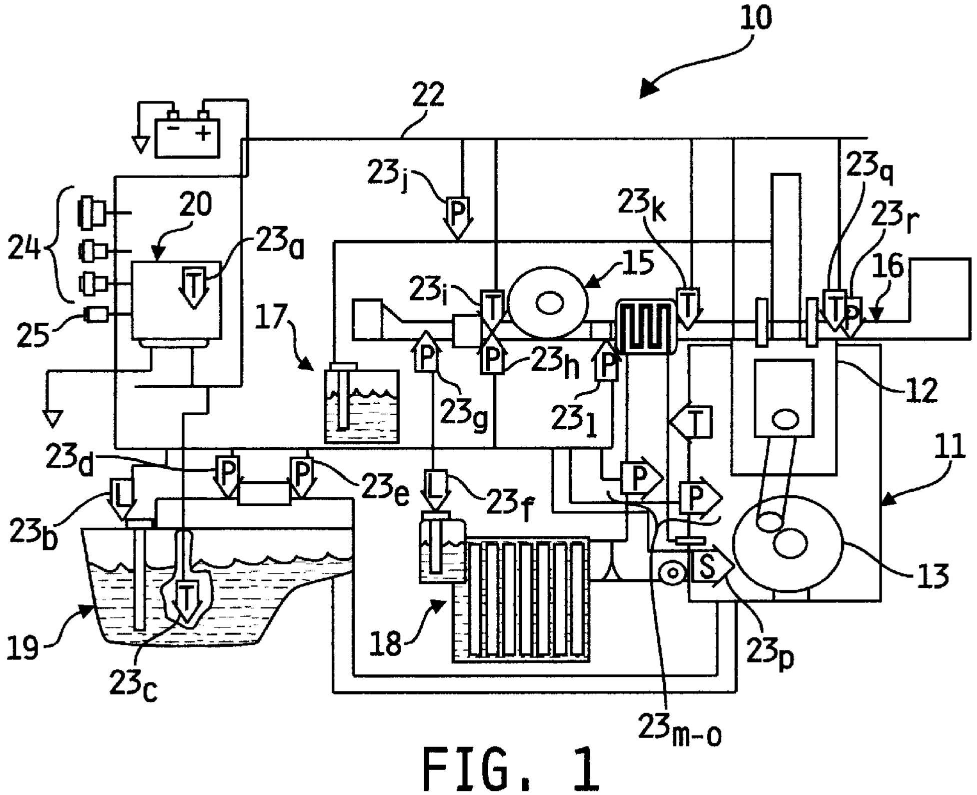
FIG. 1 is a schematic diagram of an engine operating system depicting a plurality of engine condition sensors.

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

The present invention contemplates a system and method for recognizing and/or diagnosing a particular problem, failure or fault condition when multiple fault conditions have been acknowledged by the engine control module. The invention is best implemented as a software routine within the microprocessor of the ECM. The present fault recognition and diagnosis software program can operate continuously as a background routine while the ECM controls the engine operation and monitors the output signals from each of the plurality of engine condition sensors. Alternatively, or in addition, the fault recognition system can be separately initiated by user request.

In accordance with the preferred embodiment of the invention, it is contemplated that the ECM maintains a plurality of engine failure codes, each corresponding to a particular fault condition. With the invention, certain additional fault codes are created corresponding to predetermined combinations of existing fault codes. For instance, a fault code can be created to indicate a valve seat failure for a particular cylinder, this fault code being activated upon receipt for fault codes for a rapid rise in air intake manifold temperature and for low cylinder power. As a further feature of the invention, certain fault codes for faults underlying a particular activated fault are masked or suppressed from display. This way, the engine technician can more readily focus upon the particular problem represented by the array of activated fault codes.

Figure 5:
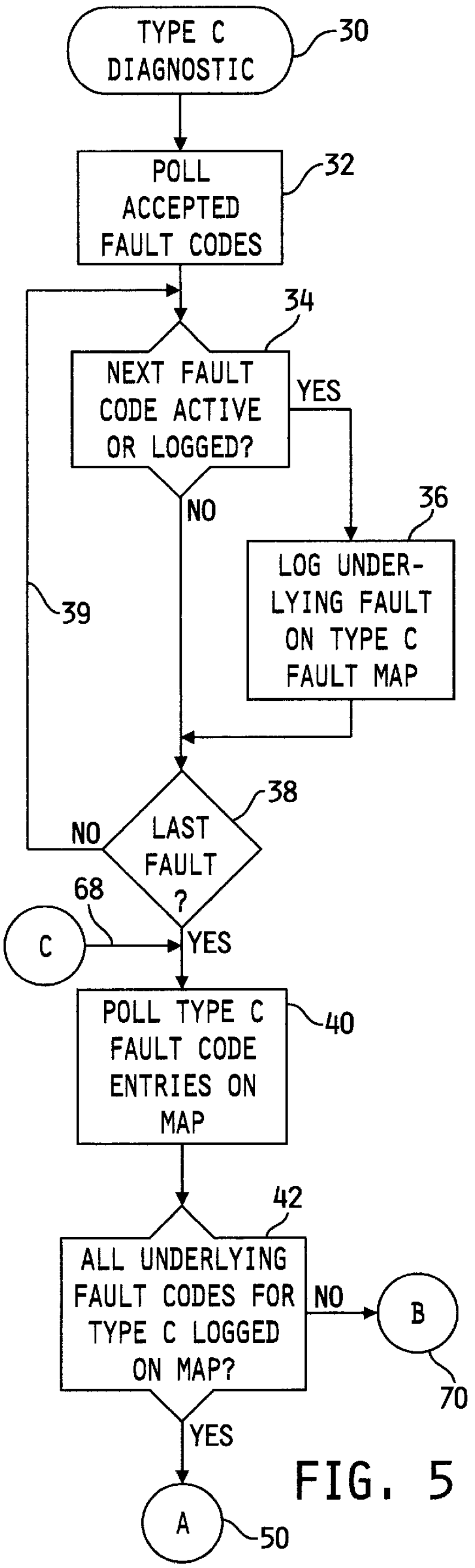
FIG. 5 is a flow chart of a first portion of an engine failure recognition and diagnostics routine, according to one embodiment of the present invention.
Figure 6:
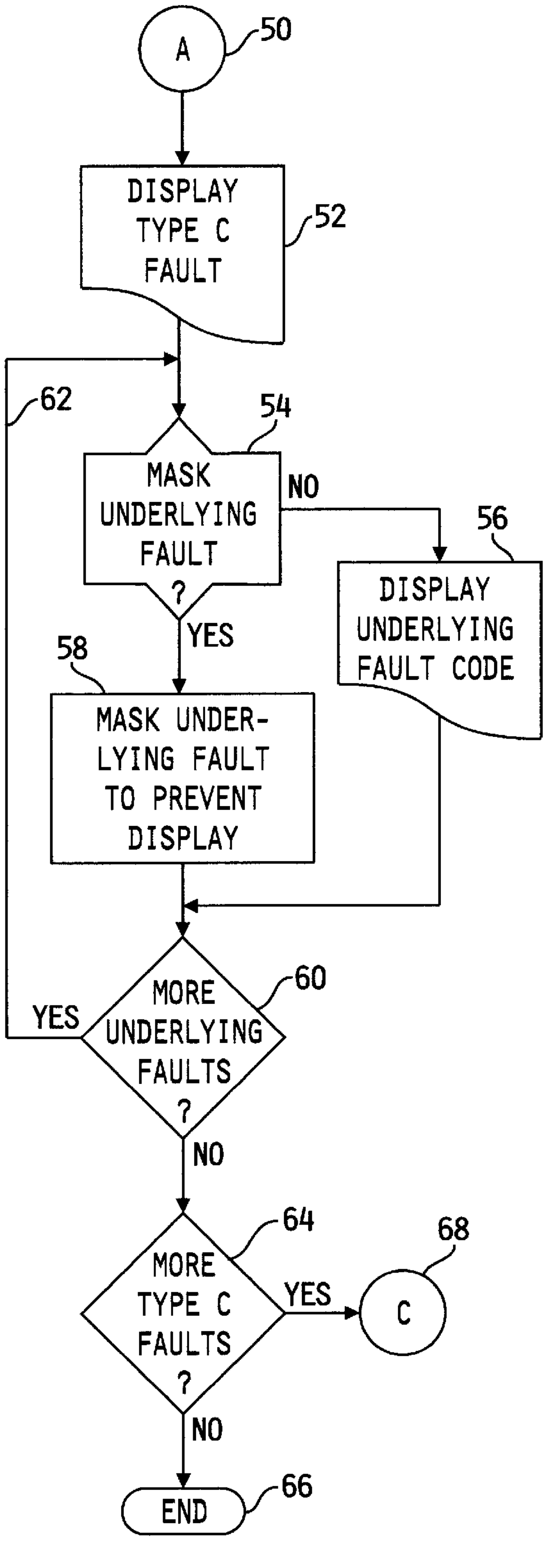
FIG. 6 is a flow chart of a continuation of the fault recognition routine shown in FIG. 5.
Figures 7, 8:
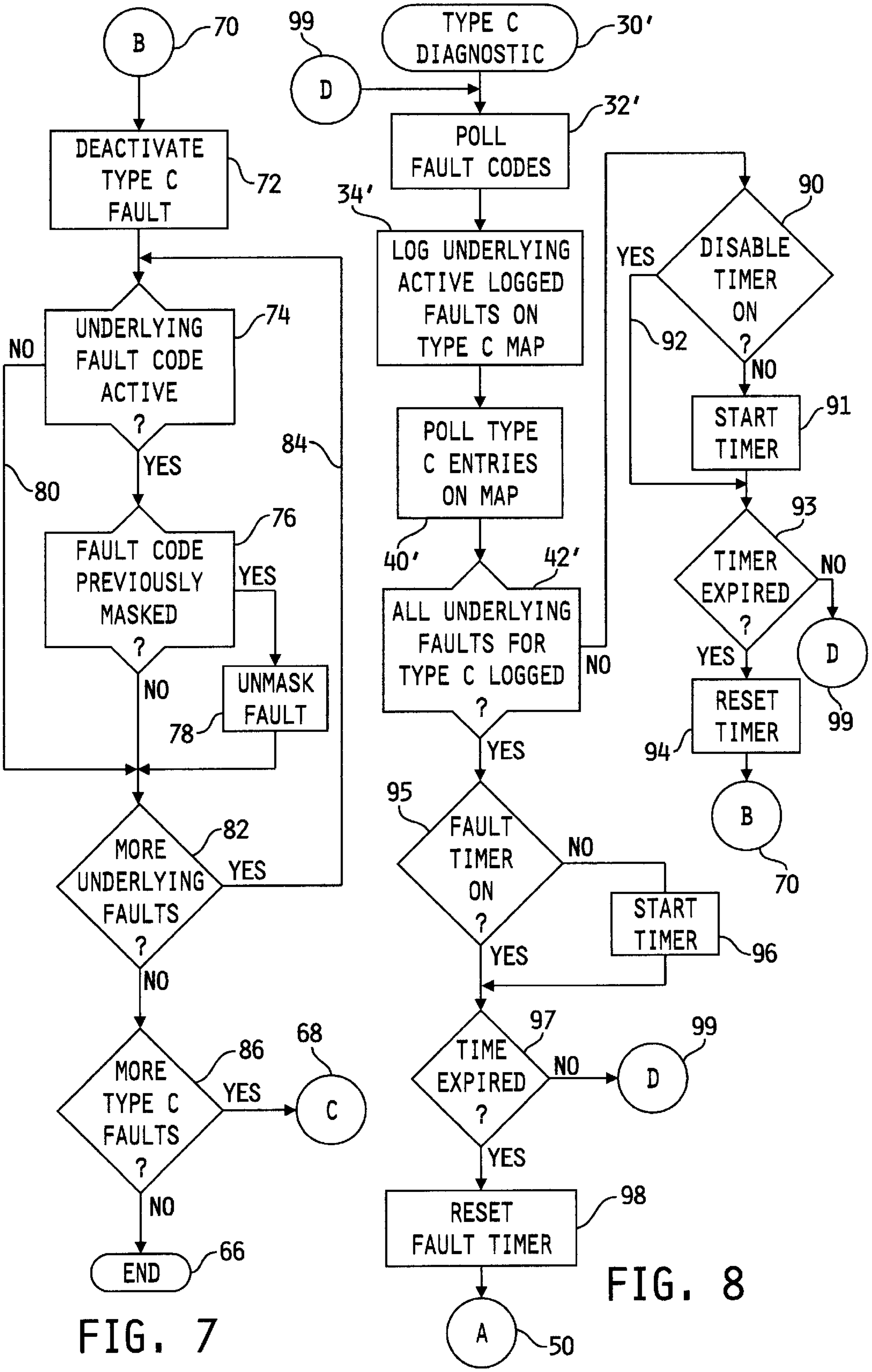
FIG. 7 is a flow chart of a branch routine from the routine shown in the flow chart of FIG. 5.
FIG. 8 is a flow chart of an engine failure recognition and diagnostics routine according to an alternative embodiment of the present invention.

In accordance with one embodiment of the invention, a software routine as depicted in the flow charts of FIGS. 5–7 can be stored within the microprocessor of the ECM 20. For the purposes of the present invention, this routine is designated a "Type C" diagnostic routine at its initiation step 30. This "Type C" designation is applied to distinguish it from the earlier described "Type A" and "Type B" faults. More specifically, the "Type A" and "Type B" fault conditions will constitute underlying faults to the activation of the "Type C" fault. In the specific embodiment, only certain ones of the "Type A" and "Type B" faults can give rise to a "Type C" fault condition. Conversely, certain of the plurality of fault codes maintained by the ECM 20 are not accepted by the inventive routine as a basis for creating a "Type C" fault condition. Referring, for example to FIG. 4, the fault code 2047 corresponding to missing broadcast data is not the basis for a "Type C" engine failure designation in the illustrated embodiments. Likewise, other fault codes, some corresponding to engine condition faults, may be excluded for consideration in the activation of "Type C" faults.

On the other hand, a number of accepted fault codes are delineated and maintained by the ECM 20. These accepted fault codes can include, for instance, fault data from the following sensors: engine speed, fuel rail pressure, pre- and post-filter oil pressure, oil temperature, oil level, coolant pressure, coolant temperature, crank case pressure, ambient air pressure, turbo charger compressor inlet air temperature, turbo charger inlet delta pressure, air intake manifold temperature, air intake manifold pressure, exhaust port temperature, radiator coolant level. In addition, fault codes corresponding to calculated engine operating conditions can be included in the list of accepted fault codes. These additional accepted fault codes can include cylinder low power, manifold temperature imbalance, and cylinder blow-by pressure. Moreover, additional accepted fault codes can correspond to system integrity information, such as fault sensor integrity and electrical harness continuity.

It is understood that a wide range of fault codes can be incorporated into the list of accepted fault codes for activating a Type C fault. In accordance with the present invention, this table of accepted fault codes is polled in step 32 to determine which, if any of the fault codes, has been activated by fault routines within the ECM 20. In step 34, it is determined whether the particular fault code among the accepted list has been activated or logged. If so, control passes to step 36 in which the particular fault code is logged on a map corresponding to a particular "Type C" fault. In other words, each "Type C" fault condition has a series of underlying fault codes that must activated before activation of the "Type C" fault. This array of "Type C" faults and underlying faults can be viewed as a map that is maintained in memory of the ECM. Thus, in one specific embodiment, if the ECM activates a particular accepted fault code, as recognized in the conditional step 34, an entry for that particular underlying fault can be logged on the fault map for each of the "Type C" faults in step 36.

It is understood that many "Type C" fault conditions can have common underlying faults. For example, a low cylinder power fault can correspond to a number of different "Type C" faults, depending upon what other underlying fault codes may be activated. Using this "map" approach, each "Type C" fault will have its own list of underlying faults, and each active or logged underlying fault will be consequently logged for each "Type C" fault entry on the map.

Alternatively, the "Type C" faults can reside within the ECM in the form of a series of "if-then" statements. In this circumstance, the "if-then" statement will generally be on the form of "If underlying fault A equals 'active' and if underlying fault B equals 'active,' then "Type C" fault is activated." With this approach, the "Type C" diagnostic routine 30 does not require a separate "Type C" fault map, but can instead sequentially poll all the accepted fault codes for each of the "Type C" fault "if then" statements.

Referring again to the specific illustrated embodiment of FIG. 5, all of the accepted fault codes are evaluated using the conditional step 38 and return loop 39. Once the last fault code has been evaluated to determine whether it is active or logged, all of the underlying faults for each "Type C" fault condition should have been logged on the fault map in step 36. At that point, each of the "Type C" fault code entries can be polled in step 40 to determine whether a "Type C" fault condition exists. For instance, in the scenario described above in which the sensor harness is disconnected, a "Type C" fault code corresponding to this failure would require that sensor failure fault codes for all of the sensors included in the harness be activated and logged on the "Type C" fault map. If this condition arises, the "harness disconnected" code is activated. Similarly, in the other example described, the valve seat failure "Type C" fault code is activated if its two underlying "Type A" and "Type B" fault codes, namely a rapid rise in air intake manifold temperature and a low power fault, are activated and logged on the "Type C" fault map. Again, step 40 can constitute evaluating the "if-then" statement to determine whether all of the underlying faults are active for the particular "Type C" fault.

In accordance with the present invention, the newly created "Type C" code provides new information to the diagnostic technician to more readily determine the nature of the problem facing the engine. Thus, in the example of the disconnected sensor harness, using prior diagnostic systems, the engine technician would be faced with a plurality of sensor signal fault codes. These plurality of fault codes can mean that each of the individual sensors is bad, which would lead the technician to evaluate each sensor More realistically, however, if all sensors show a fault code, the breach is in the sensor harness. The present invention makes this determination using software within the ECM, which software generates a "Type C" fault code that can be read by the diagnostic technician and immediately understood as a disconnected harness condition. Under the circumstance, the technician is quickly led to the source of the problem, which can be readily solved.

While the harness-disconnected condition may constitute a relatively simple problem to evaluate regardless of the diagnostic routine, the problem of valve seat failure is not. Thus, the present invention contemplates an array of "Type C" fault conditions that correspond to faults that are much more difficult to diagnose. Using prior approaches, the engine technician would evaluate all of the activated underlying fault codes and make an independent determination as to the probable source of those particular faults. In the valve seat failure example, a rapid rise in air intake manifold temperature combined with a low cylinder power fault may eventually lead the technician to determine that the source of both problems was a valve seat failure. However, any one of the underlying fault conditions may lead the engine technician along another path of diagnosis before the ultimate answer is determined. Thus, with the "Type C" fault diagnostic system 30 of the present invention, the engine technician is led directly and immediately to the source of the problem.

It can be appreciated that the range of "Type C" fault conditions can be very broad and far-reaching. The number of "Type C" fault conditions that can be evaluated by a particular ECM is generally limited only by the amount of memory required to maintain the data necessary for the evaluation, and the computational time required to assess the underlying fault codes for each "Type C" fault. In one specific embodiment, up to 32 different underlying fault codes can be evaluated to determine the existence of a similar number of "Type C" faults.

The creation of the "Type C" fault diagnostic according to the present invention represents a significant improvement in the ability of an engine technician to pinpoint particular engine problems. However, another difficulty exists when multiple underlying fault codes are logged or activated. Referring again to the disconnected harness example, the existence of the active underlying fault codes corresponding to each sensor error is misleading and can slow down the fault code flash-out process for the diagnostics technician. In the case where all the sensors are acknowledged as faulty by the ECM, it is most likely that the harness is disconnected, rather than every sensor being defective.

The present invention accounts for this difficulty by masking certain underlying faults. By the term "masking" it is meant that those particular underlying fault codes are suppressed from display to the engine diagnostic technician although the code may be otherwise held in storage by the ECM. Thus in the case of the disconnected harness, the only fault code that would be activated is the "Type C" fault code. The fault codes for each of the underlying sensor failures are masked or suppressed when the engine technician reviews all of the active fault codes for the particular engine. The underlying fault codes can be masked from contemporaneous display so that the engine technician can be quickly drawn to the source of the problem. Alternatively, the underlying fault codes could also be masked from subsequent downloading or from storage in a fault history file maintained by the ECM.

In accordance with the present invention, once it has been determined that all of the underlying fault codes for a particular "Type C" fault has been logged in step 42, control passes at continuation step 50 to subsequent steps of the routine. The "Type C" fault code is displayed at step 52. At step 54 a determination is made as to whether any or all of the underlying fault codes are to be masked. A table can be maintained corresponding to each of the underlying fault codes indicating whether a display of that code is to be suppressed once a "Type C" fault condition has been displayed in step 52. In some cases, it is contemplated that the underlying fault codes provide important information to the engine technician. In that case, the particular underlying fault is not masked, and is instead displayed in step 56. Alternatively, if the particular fault code is to be masked, display is suppressed in step 58. The conditional step 60 and return loop 62 continue until all of the underlying fault codes for a particular "Type C" fault have been evaluated and either displayed or masked. In step 64 it is determined whether any other "Type C" fault conditions exist. If not, the routine ends at step 66. If so, control passes at continuation step 68 to the main routine in FIG. 5, in particular to step 40 in which the next "Type C" fault is polled.

Thus, with the feature of the invention depicted in the flow chart of FIG. 6, certain underlying fault codes can be suppressed so as not to confuse the diagnostic process. On the other hand, certain other underlying fault codes are believed to be important and are therefore displayed concurrently in step 56 with the display of the "Type C" fault code in step 52. This display can take any known form, such as a single annunciator, a flash-out of a fault code sequence, an alphanumeric display or a CRT monitor. In addition, the displayed "Type C" and underlying fault codes can be maintained in a fault history table to be downloaded and evaluated by the engine technician using a service tool.

Using the disconnected harness example, underlying fault codes for failure of all of the engine sensors would be activated. This activation of all the sensor fault codes lead to the generation of a "Type C" fault corresponding to an indication of a disconnected harness. From the point of view of the engine technician, once the "Type C" fault code for the disconnected harness has been activated, no other fault code information is necessary. Thus, the fault codes corresponding to each of the individual sensor failures are masked from display. When this particular "Type C" fault code is activated, the engine technician can readily solve the problem by re-connecting the sensor harness.

At that point, presumably, all of the individual sensor failure codes will be de-activated, and the corresponding "Type C" fault code is also de-activated. However, under some circumstances, one or more of the individual sensors may actually have failed. In that instance, the fault code for that particular sensor will remain activated, while the fault codes for the remaining sensors will be de-activated. If all of the sensor fault codes remain masked according to step 58 of the flow chart on FIG. 6, the engine technician will never be aware of the continued existence of the underlying fault.

Thus, the present invention addresses this concern by the portion of the routine shown in FIG. 7. Once the appropriate "Type C" fault codes or underlying fault codes have been either masked or displayed, and the routine is ended in step 66, the engine technician has the opportunity to correct the problem. After the problem is corrected, the "Type C" diagnostic routine 30 re-commences. At that point, the conditional of step 42 should result in a "no" answer, meaning that all of the underlying fault codes for the particular "Type C" fault have not been logged on the fault map. In other words, the particular "Type C" fault condition no longer exists. In that case, control passes at continuation step 70 to the sequence of steps shown in the flowchart of FIG. 7.

In the first step 72, the particular "Type C" fault code is de-activated so that the fault will not be displayed. Next, a determination is made as to whether any of the underlying fault codes are activated in conditional step 74. If the particular fault code is not active, control passes on branch 80. On the other hand, if the underlying fault code is still active, control passes to conditional step 76. In this step, it is determined whether the particular underlying fault code has been previously masked from display, such as might occur in step 58 (FIG. 6). If the fault code was not masked, control passes normally to conditional step 82. On the other hand, if the fault code was previously masked as determined by conditional step 76, and the underlying fault code is still active, as determined in step 74, the particular fault code must be unmasked in step 78. At this point, the underlying fault codes can be displayed for evaluation by the engine technician.

In step 82, a determination is made as to whether any more underlying fault codes are to be considered. If so, control returns on loop 84 to evaluate the next fault code. If all of the underlying fault codes for the particular "Type C" fault have been evaluated, then a further conditional step 86 determines whether any more "Type C" fault codes must be reviewed. If more "Type C" fault codes are to be considered, control passes at continuation step 68 back to step 40 of the flowchart on FIG. 5. If all of the "Type C" fault codes have been re-evaluated, the routine ends at step 66.

It is understood that the "Type C" diagnostic routine 30 is preferably continuously executed as a background routine to the other engine control routines administered by the ECM. In this case, the end step 66 preferably constitutes a return step in which control is passed to a foreground or scheduling routine controlled by the ECM.

The benefits of the protocol depicted in the flowchart of FIG. 7 can be appreciated by again considering the harness disconnected "Type C" fault. Once the harness has been re-connected, the "Type C" diagnostic routine 30 re-evaluates all of the underlying fault codes. For the activation of a harness disconnected "Type C" fault code, all of the pre-determined underlying sensor fault codes must be activated. If any one of those fault codes is no longer activated, the "if-then" test for the particular "Type C" fault code fails and the code is deactivated in step 72. However, one or more of the sensors may still be bad, which means that the underlying fault code for those particular sensors will remain activated. Thus, the conditional step 74 will be answered in the affirmative. In addition, since those underlying sensor fault codes had been masked in step 58 (FIG. 6) on a previous pass through the routine, the answer to conditional step 66 is also affirmative. Step 78 is then necessary to unmask the fault code for the particular sensor. When that occurs, the engine technician will see yet another error that is now pinpointed to specific "bad" sensors.

In another example, an intake valve failure can correspond to a rapid rise in air intake manifold temperature and a low power for a particular affected cylinder. In this case, the "Type C" fault is an intake valve failure, and the underlying faults are rapid rise in air intake manifold temperature and low cylinder power. Following the system of the present invention, the intake valve failure "Type C" fault code will be assessed in conditional step 42 and displayed in step 52. This particular "Type C" fault codes includes the two underlying faults noted above. However, with this fault it is believed that a display of the low power fault code will help the engine technician to determine the root cause of the valve failure. On the other hand, the rapid rise in air intake manifold temperature fault code adds little or nothing to the diagnosis process. Thus, with the intake valve failure "Type C" fault, the conditional step 54 would be answered in the negative for the low cylinder power fault code, and that code would be displayed in step 56. Once the "Type C" fault code has been deactivated in step 72, if the low cylinder power underlying fault code remains active, the conditional step 74 would be answered affirmative, while the conditional step 76 would be answered in the negative since that fault code had not been previously masked. Ultimately, the underlying fault code for low cylinder power will be displayed after both passes through the routine.

Figure 2:
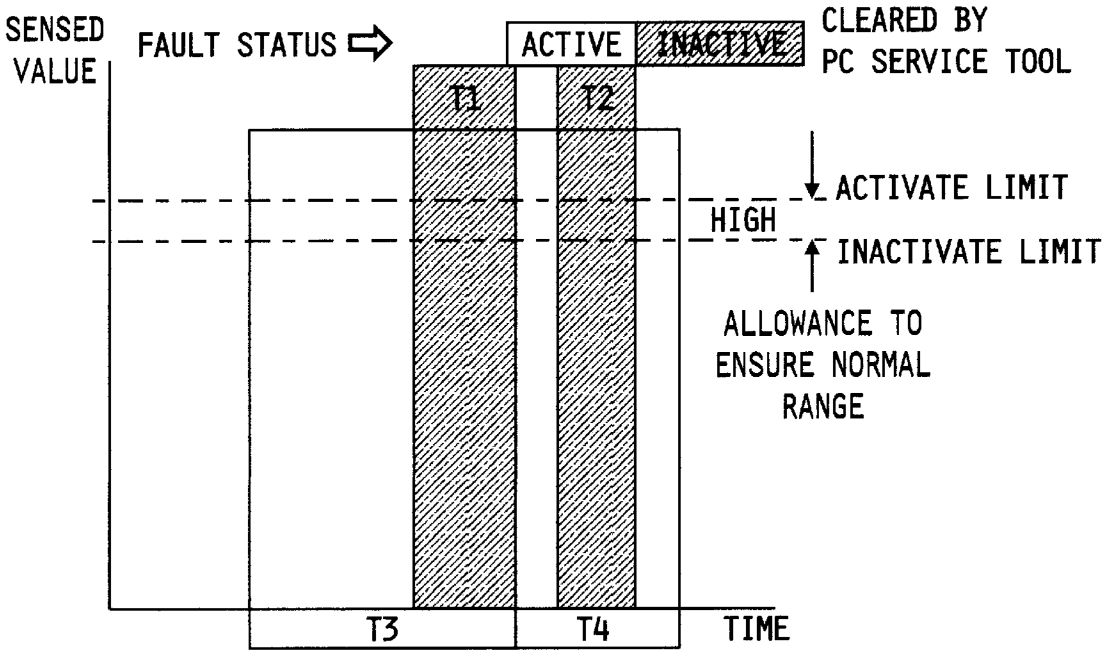
FIG. 2 is a graph showing the protocol for a particular engine failure condition.

As illustrated in the graph at FIG. 2, certain fault codes are not activated unless the particular fault condition exists for a pre-determined period of time. As well, the particular faults are not de-activated unless the fault condition has been resolved, or does not exist after a prior active fault, for a pre-determined period of time. A similar approach can be applied to the "Type C" diagnostic analysis of the present invention. Thus, in an alternative embodiment of the invention shown in FIG. 8, the "Type C" diagnostic routine 30 commences by polling the accepted fault codes in step 32. In step 34, the active underlying faults are logged on the "Type C" fault map, while at step 40 those entries are polled for each "Type C" fault code. As with the routine of FIG. 5, the conditional step 42 determines whether all of the underlying faults for each particular "Type C" fault has been logged. However, under certain circumstances, certain underlying fault codes for a particular "Type C" fault may go inactive after having been active due to anomalies and external influences. In order to ensure that a particular underlying fault is truly inactive, the present invention contemplates a "Type C" fault disable timer. This timer can refer to actual clock time maintained by the ECM 10, or to a software counter that is incremented with each pass through routine 30. Thus, in step 90 a determination is made as to whether the disable timer has been started. If not, the timer is initiated in step 91, and if so, control passes to loop 92.

In conditional step 93 the timer is checked to see if it has expired. If so, the timer is reset in step 94 and control passes on continuation step 70 to the subroutine of FIG. 7. If the timer has expired in step 93 when not all underlying faults have been logged, then the "Type C" fault has not occurred. Thus, the "Type C" fault code is deactivated in step 72 (FIG. 7) and the program flows as previously described. If the disable timer has not expired, control returns at continuation step 99 to poll the underlying fault codes again.

Returning back to step 42, if all the underlying fault codes are active then the particular "Type C" fault has presumptively occurred. In order to avoid a "false positive," a fault timer is utilized. Like the disable timer, the fault timer can be based on clock time or software. If the timer is not initiated at step 95, it is started in step 96. If the fault timer has not expired in step 97, control returns at step 99 to re-poll the underlying fault codes.

At each pass through the diagnostic routine 30, the underlying faults for each "Type C" are evaluated. As long as the conditions for a "Type C" fault remain active control will pass through steps 95–97. If the timer expires in step 97 under "Type C" fault conditions, control passes to continuation step 50, and the display step 52 of the flowchart in FIG. 6. The fault timer is also reset in step 98.

The routine depicted in the flowchart of FIG. 8 can be modified to reset the disable and fault timers each time the conditional step 42 cycles to a different outcome. In other words, on a first pass the result of step 42 can be negative, meaning no "Type C" fault, and the disable timer will be initiated. The fault timer will continue to run only so long as conditional step 42 remains negative. Once the step 42 is answered in the affirmative, "Type C" fault conditions have occurred, the disable timer can be stopped, and the fault timer started.

As a further alternative, the fault timer can continue to run, even when the conditional step 42 cycles negative during one pass through the routine. Thus, momentary changes in state will not affect the "Type C" fault determination over a predetermined fault timer period. The same approach can be taken with the disable timer in steps 90–94.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

For example, throughout the above discussion, the fault codes have been evaluated as either "active" or "inactive". A third state for the faults and underlying codes can be "logged", meaning that the fault had been active but is not presently active. This "logged" state can be used by the inventive algorithm as a basis for issuing a "Type C" fault condition.

The present invention can be modified to consider an array of underlying fault codes, some of which are active, some logged and some inactive. In other words, a "Type C" condition may be programmed to arise when Fault 1 is active, Fault 2 is active, Fault 3 is logged, and Fault 4 is inactive. Certain non-fault conditions can also be applied in making the "Type C" fault determination. For instance, a particular "Type C" fault may require certain steady state normal engine operating conditions, such as the engine is running (engine speed at or above idle speed) and warm (oil temperature above a threshold value).

Along these same lines, the inventive algorithm can be modified to implement a conditional statement in the activation of a "Type C" fault. For example, a particular "Type C" fault can be activated if either condition 1 or condition 2 is met. Condition 1 can correspond to the states of a number of underlying faults, while condition 2 can correspond to the states of a different number of underlying faults.

As a further modification, one "Type C" fault condition can require the activation of another "Type C" fault. It should be understood that the underlying fault map for a particular "Type C" fault can be established to provide the greatest amount of information to the diagnostics technician. With this as an object, even inactive fault codes can provide valuable information to make the diagnosis process quicker and more accurate.

What is claimed is:

1. A system for fault recognition for an internal combustion engine, comprising:

a plurality of sensors operable to sense conditions of the engine;

a controller associated with the engine and including;

means for receiving sensor signals from each of said plurality of sensors; and means for setting the state of a fault signal for each of said plurality of sensors as a function of said sensor signals; and fault recognition means for activating a fault recognition signal only when all of a predetermined group of said fault signals have been set to a predetermined state for each fault signal in said group.

2. The system for fault recognition according to claim 1, wherein:

said controller includes means for displaying an indicia indicative of the state of a corresponding one of said fault signals; and said fault recognition means includes means for masking the display of said indicia corresponding to selected ones of said fault signals in said predetermined group.

3. The system for fault recognition according to claim 2, wherein:

said means for setting the state of a fault signal is operable to set an "activated" state when said corresponding sensor signal falls outside a corresponding threshold, and a "de-activated" state when said signal is within said threshold; and said means for masking is operable to mask the display of said indicia for fault signals in said group set to the "activated" state.

4. The system for fault recognition according to claim 1, wherein said fault recognition means includes means for displaying a fault indicia indicative of the activation of said fault recognition signal.

5. The system for fault recognition according to claim 4, wherein said means for displaying said fault recognition means is operable to display said fault indicia when said fault recognition signal has been activated for a predetermined period.

6. The system for fault recognition according to claim 1, wherein:

said controller is operable to continuously periodically receive said sensor signals and set the state of said fault signals; and said fault recognition means is operable to activate said fault recognition signal only when all of said predetermined group of fault signals have been set to said predetermined state for a predetermined period.

7. The system for fault recognition according to claim 1, wherein:

said controller includes a microprocessor;

said means for setting the state of said fault signals includes software commands for comparing said sensor signals to a corresponding threshold and for setting an "activated" state for said signals outside said corresponding threshold; and said fault recognition means includes software commands for evaluating the state of said fault and for activating said fault recognition signal.

8. A method for fault recognition for an internal combustion engine, the engine including a plurality of sensors operable to sense a plurality of engine operating conditions and an on-board monitoring system operable to set the state of fault signals in relation to the output of each sensor, said method comprising the steps of:

polling the state of fault signals set by the monitoring system; and activating a fault recognition signal only when all of a predetermined group of fault signals have been set to a predetermined state for each fault signal in said group.

9. The method for fault recognition according to claim 8, further comprising in response to activation of a fault recognition signal, masking selected ones of the fault signals in the predetermined group to prevent display thereof.

10. The method for fault recognition according to claim 9, comprising the subsequent steps of:

polling the state of the fault signals set by the monitoring system at a subseqeunt time;

de-activating the fault recognition signal of all the fault signal in the predetermined group are not in said predetermined state.

11. The method for fault recognition according to claim 10, wherein the de-activating step occurs only if all the fault signals are not in said predetermined state for a predetermined period.

12. The method for fault recognition according to claim 11, wherein said predetermined period is a period of time.

13. The method for fault recognition according to claim 11, wherein said predetermined period is a predetermined number of executions of said polling step.

14. The method for fault recognition according to claim 10, further comprising the subsequent of, when the fault recognition signal has been de-activated, unmasking fault signals within the predetermined group.

15. The method for fault recognition according to claim 9, in which the monitoring system is operable to set the state of a fault signal to "activated" when a fault condition exists and to "de-activated" when the fault condition does not exist, wherein said selected ones of the fault signals include only those fault signals with an "activated" state.

16. The method for fault recognition according to claim 8, further comprising the step of displaying the fault recognition signal following the activating step.

17. The method for fault recognition according to claim 16, wherein the displaying step occurs only if the fault recognition signal has been activated for a predetermined period.

18. The method for fault recognition according to claim 17, further comprising displaying only selected ones of the fault signals while displaying the fault recognition signal.

19. the method for fault recognition according to claim 8, comprising the subsequent step of:

polling the state of fault signals set by the monitoring system at a subsequent time;

de-activating the fault recognition signal if all the fault signals in the predetermined group of fault signals are not in said predetermined state.

20. The method for fault recognition according to claim 19, wherein the de-activating step occurs only if all the fault are not in said predetermined state for a predetermined period.

21. The method for fault recognition according to claim 20, wherein said predetermined period is a period of time.

22. The method for fault recognition according to claim 20, wherein said predetermined period is a predetermined number of executions of said polling step.

23. The method for fault recognition according to claim 8, in which the monitoring system is operable to set the state of a fault signal to "activated" when a fault condition exists and to "de-activated" when the fault condition does not exist, wherein said predetermined state for all of said predetermined group of fault signals is "activated".

* * * * *

UNITED STATES PATENT AND TRADEMARK OFFICE

CERTIFICATE OF CORRECTION

PATENT NO : 6,112,150

DATED : August 29, 2000

INVENTOR(S) : John M. Irons et al.

It is certified that error appears in the above-identified patent and that said Letters Patent are hereby corrected as shown below:

On the title page, after the list of Inventors, insert:

--Assignee: Cummins Engine Company, Inc., Columbus, Ind.--

Signed and Sealed this

First Day of May, 2001

*Attest:*

Nicholas P. Godici

NICHOLAS P. GODICI

*Attesting Officer*

*Acting Director of the United States Patent and Trademark Office*

UNITED STATES PATENT AND TRADEMARK OFFICE

CERTIFICATE OF CORRECTION

PATENT NO. : 6,112,150 
DATED : August 29, 2000
INVENTOR(S) : John M. Irons et al.

It is certified that error appears in the above-identified patent and that said Letters Patent is hereby corrected as shown below:

Title page,
Please add the following, -- Assignee: Cummins Engine Company, Inc., Columbus, Indiana. --

Signed and Sealed this

Eleventh Day of September, 2001

*Attest:*

Nicholas P. Godici

NICHOLAS P. GODICI

*Attesting Officer* *Acting Director of the United States Patent and Trademark Office*